United States Patent
Mantell et al.

(10) Patent No.: US 11,760,018 B2
(45) Date of Patent: Sep. 19, 2023

(54) SYSTEM AND METHOD FOR ADDITIVE MANUFACTURE OF THREE-DIMENSIONAL (3D) PRINTED OBJECTS WITH UV-CURABLE MATERIAL USING A POROUS SUBSTRATE

(71) Applicant: Xerox Corporation, Norwalk, CT (US)

(72) Inventors: David A. Mantell, Rochester, NY (US); Paul J. McConville, Rochester, NY (US); Dinesh Krishna Kumar Jayabal, Cary, NC (US); Viktor Sukhotskiy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 243 days.

(21) Appl. No.: 17/244,185

(22) Filed: Apr. 29, 2021

(65) Prior Publication Data

US 2022/0347920 A1    Nov. 3, 2022

(51) Int. Cl.
| | |
|---|---|
| *B33Y 30/00* | (2015.01) |
| *B29C 64/245* | (2017.01) |
| *B29C 64/268* | (2017.01) |
| *B29C 64/135* | (2017.01) |
| *B33Y 50/02* | (2015.01) |
| *B29C 64/371* | (2017.01) |
| *B33Y 10/00* | (2015.01) |
| *B29C 64/393* | (2017.01) |

(52) U.S. Cl.
CPC .......... *B29C 64/268* (2017.08); *B29C 64/135* (2017.08); *B29C 64/245* (2017.08); *B29C 64/371* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 10,336,000 B2 | 7/2019 | Goldman et al. | |
| 11,584,073 B2* | 2/2023 | Mamrak | B29C 64/268 |
| 2004/0238522 A1* | 12/2004 | Edwards | B41J 3/543 |
| | | | 219/444.1 |
| 2010/0060875 A1* | 3/2010 | Kwon | F15B 7/08 |
| | | | 427/508 |
| 2020/0094468 A1* | 3/2020 | Feller | B29C 64/245 |
| 2020/0276761 A1* | 9/2020 | Nishida | G02B 26/105 |
| 2021/0146616 A1* | 5/2021 | Mansouri | B33Y 10/00 |
| 2021/0162657 A1* | 6/2021 | Chartrain | B29C 64/135 |
| 2022/0355548 A1* | 11/2022 | Wynne | B33Y 50/02 |

\* cited by examiner

*Primary Examiner* — Leith S Shafi
*Assistant Examiner* — Tiffany Yu Huang
(74) *Attorney, Agent, or Firm* — Maginot Moore & Beck LLP

(57) ABSTRACT

A three-dimensional (3D) object printer operates a radiation source to direct radiation emitted by the radiation source through a porous substrate at a first intensity insufficient to cure a material contained in the porous substrate and at a second intensity sufficient to cure the material after the emitted radiation has passed through the porous substrate. The material is applied to the porous substrate by one or more wipers.

19 Claims, 2 Drawing Sheets

SYSTEM AND METHOD FOR ADDITIVE MANUFACTURE OF THREE-DIMENSIONAL (3D) PRINTED OBJECTS WITH UV-CURABLE MATERIAL USING A POROUS SUBSTRATE

TECHNICAL FIELD

This disclosure is directed to three-dimensional (3D) object printers that expose liquid materials to radiation to form three-dimensional (3D) objects and, more particularly, to 3D object printers that oxygenate UV-curable materials during object formation.

BACKGROUND

Three-dimensional printing, also known as additive manufacturing, is a process of making a three-dimensional solid object from a digital model of the object. Many three-dimensional printing technologies use an additive process in which an additive manufacturing device forms successive layers of a part on previously formed layers. Some of these technologies use ejectors that eject drops of melted materials, such as photopolymers, elastomers, and metal. Other additive manufacturing devices form the object layers through solidification of a photo curable resin using visible or UV light irradiation. One such known technique can provide new layers formed at the top surface of an object being fabricated. Another technique can provide new layers at the bottom surface of the object being fabricated. All of these additive manufacturing methods are distinguishable from traditional object-forming techniques, which mostly rely on the removal of material from a work piece by a subtractive process, such as cutting or drilling.

The known additive manufacturing processes that expose resins to radiation to form product layers are quite complicated. They typically rely on control of oxygen diffusion through a window in a reservoir of the resin to inhibit UV curing of and to regulate the flow of the resin material to replace partially cured material. More importantly, the resin materials are quite expensive and are the main determinant of the price of the manufactured parts. The amount of material needed for the printing of the parts and possibly wasted after formation of the object can be significant. A printer and its method of operation that avoids these disadvantages would be beneficial.

SUMMARY

A new method of operating an additive manufacturing system that exposes resin material to radiation to form object layers reduces the amount of resin wasted and attenuates the degree to which the oxygenation of the resin material must be controlled. The method includes providing a first material to a first surface of a porous substrate having a plurality of passageways that extend from the first surface of the porous substrate to a second surface of the porous substrate, and operating a radiation source to direct emitted radiation through the porous substrate toward a support platform positioned to receive the first material from the second surface of the porous substrate.

A new additive manufacturing system that exposes resin material to radiation to form object layers reduces the amount of resin wasted and attenuates the degree to which the oxygenation of the resin material must be controlled. The system includes a support platform, a porous substrate having a plurality of passageways from a first surface of the porous substrate to a second surface of the porous substrate, and a radiation source configured to emit radiation and direct the emitted radiation through the porous substrate toward the support platform.

BRIEF DESCRIPTION OF THE DRAWINGS

The foregoing aspects and other features of a method of operating an additive manufacturing system and a new additive manufacturing system additive manufacturing system that exposes resin material to radiation to form object layers while reducing the amount of resin wasted and attenuating the degree to which the oxygenation of the resin material must be controlled are explained in the following description taken in connection with the accompanying drawings. The method and system described below use a porous substrate to oxygenate the resin material up to the object/resin interface and then focus the intensity of the radiation to a level that overcomes the oxygenated resin and partially cures it to form layers of the object before thermal treatment finishes the curing of the object.

DETAILED DESCRIPTION

Figure 1:
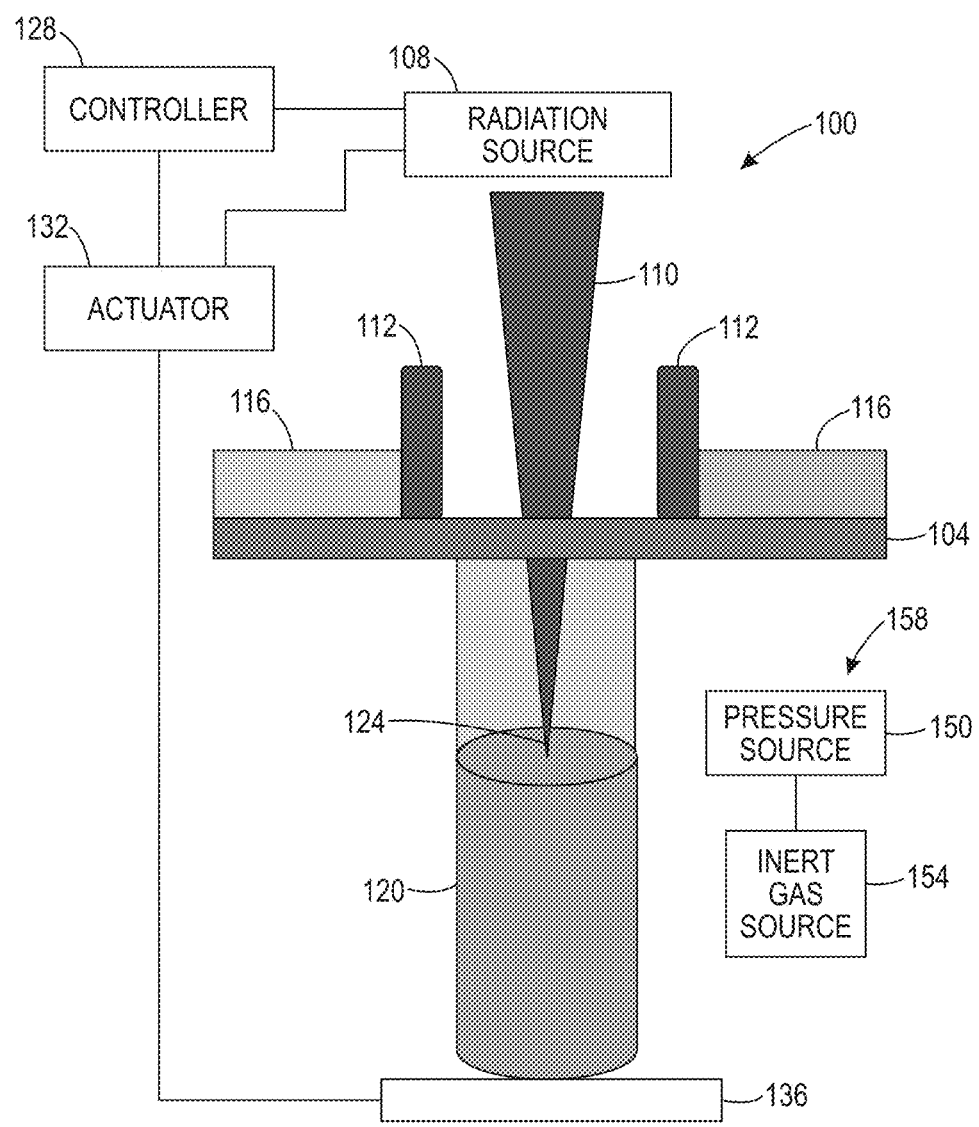
FIG. 1 depicts an embodiment of the 3D object production system that exposes resin material to irradiation to form object layers while reducing the amount of resin wasted and attenuating the degree to which the oxygenation of the resin material must be controlled.

For a general understanding of a 3D object printer and its operation that that exposes resin material to radiation to form object layers while reducing the amount of resin wasted and attenuating the degree to which the oxygenation of the resin material must be controlled, reference is made to the drawings. In the drawings, like reference numerals designate like elements.

FIG. 1 illustrates an embodiment of a 3D object printer 100 that exposes resin material to irradiation to form object layers. Although the description below is made with reference to the 3D object printer of FIG. 1, other embodiments consistent with the principles of operation and configuration disclosed herein can be envisioned.

The printer 100 of FIG. 1 includes a porous substrate 104 and a radiation source 108 that produces radiation 110 for at least partially curing the resin 116 to form layers of an object 120. As used in this document, the term "porous substrate" means a planar structure having void ratio of 60% to 95%. A void ratio is the ratio of air volume in the substrate to the volume of solid in the substrate times 100%. Contact of the resin 116 with an upper surface of the porous substrate 104 is regulated by a controller 128 operating one or more actuators 132 to move wipers 112 over the upper surface of the substrate 104. The controller 128 also operates one or more actuators 132 to move the radiation source 108 into and out of the plane of FIG. 1 in a raster pattern over an area of the porous substrate 108. That is, the radiation source is moved in an X-Y plane that is parallel to the plane of the substrate 104. As used in this document, the axis that goes into and out of the figure plane is called the Y axis while the axis that is perpendicular to this axis is the X axis, although this nomenclature could be reversed. As used in this document, the term "raster pattern" means moving along the Y axis in a first direction, then moving along the X axis, and then moving along the Y axis in a direction that is the opposite of the first direction along the Y axis. The actuator(s) 132 also move the wipers across the porous substrate 104 in a bidirectional manner along the X axis. One or more actuators are also operatively connected to support platform 136 so the controller 128 can operate the actuators to move the platform along the Z axis, which is perpendicular to the X-Y plane parallel to the porous substrate 104, to maintain the separation between an upper surface of the object 120 and the lower surface of the porous substrate as object layers are formed.

In more detail, the porous substrate 104 can be a microchannel plate. One microchannel plate is formed with a plurality of glass tubes, typically having a diameter of about 10 to about 15 µm, that are fused in an arrangement so they are parallel to one another to form an array. Microchannel plates are often used for electron multipliers. The insides of the tubes are coated with an emitter material that generates electrons when the material receives an electron. Thus, entry of an electron at one end of the tube results in the egress of a plurality of electrons at the other end of the tube. In the printer 100, however, the glass tubes of the microchannel plate provide paths for migration of the resin from the upper surface of the substrate 104 to the lower surface of the substrate that is proximate an upper surface of the object 120. A coating on the inside of the channels can be used to ensure wetting and flow of the material through the channels. The action of the wipers, described in more detail below, urge resin into the pores of the upper surface of the substrate 104 and this ingress of resin pushes resin onto the lower surface of the substrate. Because the upper and lower surfaces of substrate 104 are exposed to ambient air, the resin within the substrate 104 remains well-oxygenated. This property is important for layer formation as noted below. While known microchannel plates are an effective embodiment of the porous substrates, other implementations can be used as long as the flow of resin through the substrate can be controlled adequately. For example, metal organic frameworks (MOFs), zeolites, porous silicon, macro-porous polymer, and the like can be used to implement porous substrate 104. The thickness of the porous plate regardless of implementation is in a range of about 400 microns to about 1000 microns. Additionally, the porous plate can be a structure that operates as a lens on the radiation emitted by the radiation source 108 because of its shape, index of refraction variation, arrangement of the holes, and combinations of these features. For example, the porous substrate can manufactured to operate as a Fresnel lens for UV radiation emitted by the radiation source 108. Reflection or scattering of the UV radiation is calculated using the formula $R=((n_1-n_2)/(n_1+n_2))^2$, where $n_1$ and $n_2$ are the indices of reflection for the porous substrate and resin. If these indices differ by about 10%, then the reflection value is about 0.25%, which is an acceptable upper limit value for the UV scattering. Additionally, a cleaning procedure can be included to prevent permanent clogging of the porous plate. One embodiment of such a substrate cleaner 158 (shown in FIG. 1) includes a source of inert gas 154 and a pressure source 150 for forcing the inert gas through the pores of the porous substrate. The pressure source can be a negative or positive pressure source, such as a vacuum or a compressor, respectively.

The thin layer of resin between the upper surface of the object 120 and the lower surface of the porous substrate 104 is advantageous for a number of reasons. First, less material in this interface limits the waste of the resin during the process. Second, by providing a small amount of resin on the surface of the porous substrate, within the pores of the substrate, and on the surface of the object, less resin is exposed to ambient curing than the amount of resin exposed in other stereolithography processes that use a reservoir of resin. Exposure of a reservoir of resin to ambient curing conditions limits the time that the resin is in its optimal condition for manufacturing so less resin is wasted by the process disclosed in this document. Third, change from one material to another material can occur quickly because only a small amount has to be discharged through the porous substrate to position the next material at the upper surface of the object. Changes in material are useful for producing different properties in the 3D object. The thin material interface between the part and the lower surface of the porous substrate also helps ensure that the material in the substrate and on the upper surface of the object is well oxygenated.

The controller 128 can be configured to operate one or more actuators 132 to move the wipers independently or in the same direction at the same time. Although the wipers 112 are depicted as blades in FIG. 1, other implementations of wipers, such as rollers, air knifes, or the like, can be used as well. In one embodiment, when the radiation source 108 reaches the end of its movement along the Y axis, at least one wiper follows the radiation source along the X axis in the direction that the radiation source is moved before the radiation source is moved along the Y axis in the opposite direction of its prior Y axis movement for the next raster pattern scan. Although the raster pattern movement of the radiation source can occur in this reciprocating movement of the radiation source along the Y axis separated by movement in the X axis, the radiation source can be stationary and the emitted radiation is moved across the porous plate 104 in a raster pattern within the X-Y plane by directing the radiation toward rotating mirrors or the like within the radiation source. The movement of the wiper following the radiation beam along the X axis moves resin into the openings in the upper surface of the porous substrate while movement of the wiper preceding the radiation beam wipes the upper surface clean. The controller 128 operates the one or more actuators 132 to move the wipers continuously because temporarily halting movement of the wipers produces ridges of resin on the substrate. When both the radiation source and the wipers reach an edge of the X axis, the movements of the wipers are reversed to lead and follow the reversed movement of the radiation source along the X axis. This wiping of the material helps ensure that the material flows through the substrate to fill the space between the substrate and the upper surface of the part. Wiping can also force material through all the pores of the substrate to reduce the likelihood of material remaining within the system too long. As noted previously, the wipers can also change the material used in the system. If one material is wiped away, another material can be introduced into the system by the opposite wiper to alter the properties of the object at various heights of its production. In some embodiments a single wiper is used. In this embodiment, the single wiper follows the radiation beam to provide resin to the upper surface of the porous substrate and upon the return path meters the resin in a uniform thin layer on the upper surface of the porous substrate before the radiation beam is directed through the porous substrate.

The controller 128 operates the radiation source 108 to focus the radiation so its intensity is sufficient to overcome the oxygen inhibition of the resin to curing only near the surface of the object 120. The term "radiation source" as used in this document means a laser or LED having an electronic control interface for activating and deactivating the laser or LED quickly and that directs emitted radiation into optical components for focusing the radiation. The activation time period for the radiation source must be long enough to cure the resin between the object and the porous substrate in the region of focused radiation but short enough that that average intensity of the UV radiation within the pores does not cure the resin within the pores of the porous substate. The presence of oxygen in UV materials inhibits the curing of the material. By regulating the focus 124 (FIG. 1) of the radiation, the radiation has insufficient energy to cure, even partially, the resin in the porous substrate 104. Only at or near the upper surface of the object 120 is the energy of the radiation sufficient to cure, at least partially, a thin portion of the resin in order to form the next object layer. This operation of the radiation source 108 preserves the amount of uncured resin between the object and the lower surface of the porous substrate until it is urged toward the object by the ingress of additional resin into the porous plate. This uncured material then enters the zone where the focused energy of the radiation is able to cure, at least partially, and form the next object layer. The controller 128 also turns the radiation source 108 on and off selectively to shape the layer being formed. Thus, this method of system operation uses less resin than previously known systems that requires tight regulation of oxygen diffusion in the resin between a surface of the object and a window through which radiation passes for continuous formation of object layers. Additionally, the focus control of the exposing radiation is simpler than the regulation of oxygen in the resin through which the radiation passes.

In another embodiment, an inert gas, such as nitrogen or argon, is introduced to the volume in which the object 120 is being formed to reduce the amount of oxygen in the resin after it has passed through the porous substrate. Reducing oxygen in the resin at this location is helpful to reduce the intensity of the radiation required for curing at the upper surface of the object. In a similar manner, since the level of oxygen in the resin inhibits unwanted polymerization on the upper surface of and within the porous substrate, oxygen levels at the upper surface of the porous substrate can be increased to ensure this effect in the porous substrate. Either of these approaches can be used to help ensure that the curing of the resin only occurs at the upper surface of the object and that the intensity of the radiation source at the resin/object interface can be more easily controlled.

Figure 2:
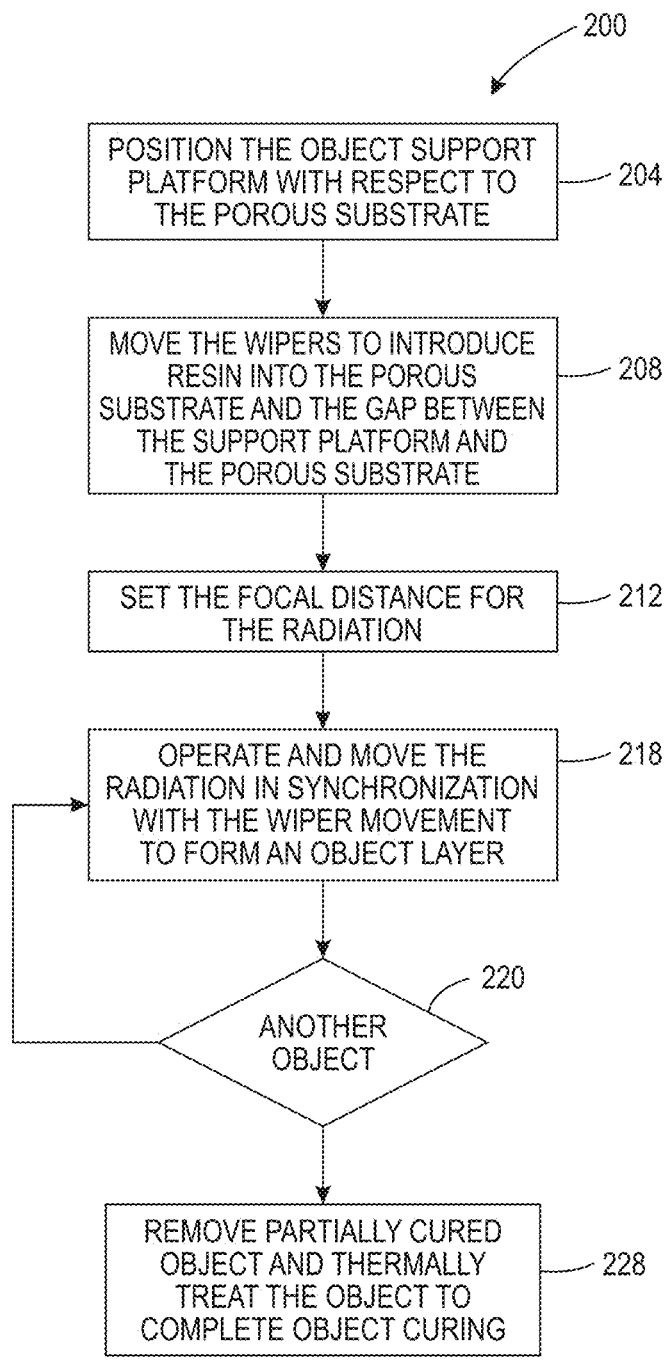
FIG. 2 is a flow diagram of a process implemented by a controller operating the system of FIG. 1 to expose resin material to radiation to form object layers while reducing the amount of resin wasted and attenuating the degree to which the oxygenation of the resin material must be controlled.

A process for operating a 3D object printer to use less resin material and require less control of the oxygen levels throughout the resin material is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 128 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram of a process that operates a 3D object printer, such as printer 100, to use less resin and require less control of oxygen levels throughout the resin material. The process 200 begins with positioning of the support platform to form a gap for holding the resin between the lower surface of the porous substrate and the upper surface of the object as it is being formed (block 204). The wipers are moved across the upper surface of the porous substrate to load resin into the pores of the porous substrate so the resin enters the gap between the porous substrate and the support platform and to provide a uniformly thin layer on top of the substrate prior to any radiation exposure (block 208). The radiation source focal distance is set to focus the radiation in the gap at an intensity that at least partially cures the resin to form object layers (block 212). The process continues with the radiation source being operated and moved in a raster pattern (or the radiation is moved in the raster pattern) across the porous substrate to form an object layer while the wipers are continuously moved in synchronization with the movement of the radiation to wipe the surface of the porous substrate clean for radiation exposure and to replace the resin on the surface of the porous substrate after radiation (block 220). That is, the wiper that moves before the radiation beam wipes the upper surface of the porous substrate and the wiper following the radiation beam refreshes the resin on the upper surface so resin can enter the porous substrate. The operation of the radiation source refers to the selective activation of the source according to the digital model of the object to form the layers of the object. If another object layer is to be formed (block 224), the Z axis position of the platform is adjusted and the next object layer is formed (block 220). Once all of the object layers are formed, the process stops so the object can be thermally treated to fix the epoxy elements in the resin (block 224).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A 3D object printer comprising:
a support platform configured to support an object made with cured liquid photo curable resin;
a porous substrate having a plurality of passageways that extend from a first surface of the porous substrate to a second surface of the porous substrate, the passageways being configured to enable flow of a liquid photo curable resin from the first surface of the porous substrate through the passageways of the porous substrate to the second surface of the porous substrate; and
a radiation source configured to emit radiation and direct the emitted radiation through the passageways in the plurality of passageways in the porous substrate before curing a portion of the liquid photo curable resin between the second surface of the porous substrate and the support platform to form a layer of the object supported by the support platform.

2. The 3D object printer of claim 1 further comprising:
a plurality of actuators, a first actuator in the plurality of actuators being operatively connected to the support platform and configured to move the support platform along a Z axis with respect to the porous substrate and a second actuator in the plurality of actuators being operatively connected to the radiation source and configured to move the emitted radiation in a X-Y plane that is parallel to the first surface of the porous substrate; and a controller operatively connected to the radiation source and the plurality of actuators, the controller being configured to:

operate the radiation source so the emitted radiation has an intensity sufficient to cure the liquid photo curable resin only at a position between the second surface of the porous substrate and the support platform; and operate the first actuator in the plurality of actuators to move the support platform away from the porous substrate and operate the second actuator in the plurality of actuators to move the emitted radiation in the X-Y plane.

3. The 3D object printer of claim 2, the controller being further configured to:

operate the second actuator in the plurality of actuators to move the radiation source in the X-Y plane to move the emitted radiation in the X-Y plane.

4. The 3D object printer of claim 3, the controller being further configured to:

operate the second actuator in the plurality of actuators to move the radiation source in a raster pattern within the X-Y plane.

5. The 3D object printer of claim 2 further comprising:
a first wiper;
a third actuator in the plurality of actuators, the third actuator in the plurality of actuators being operatively connected to the first wiper; and
the controller being further configured to:
operate the third actuator in the plurality of actuators to move the first wiper across the first surface of the porous substrate to urge the liquid photo curable resin into the plurality of passageways in the porous substrate.

6. The 3D printer of claim 5, the controller being further configured to:

synchronize movement of the first wiper with movement of the emitted radiation in the X-Y plane.

7. The 3D printer of claim 5 further comprising:
a second wiper separated by a distance from the first wiper that is wider than a width of the emitted radiation so the emitted radiation passes between the first wiper and the second wiper as the emitted radiation moves in the X-Y plane;
a fourth actuator in the plurality of actuators, the fourth actuator in the plurality of actuators being operatively connected to the second wiper; and
the controller being further configured to:
operate the fourth actuator in the plurality of actuators to move the second wiper across the first surface of the porous substrate and maintain the distance between the first wiper and the second wiper.

8. The 3D printer of claim 2 further comprising:
a source of inert gas; and
a pressure source, the pressure source being configured to urge inert gas from the source of inert gas through the plurality of passageways in the porous substrate.

9. The 3D printer of claim 8 wherein the pressure source is a positive pressure source.

10. The 3D printer of claim 9 wherein the pressure source is a compressor operatively connected to the source of inert gas to urge the inert gas through the plurality of passageways in the porous substrate.

11. The 3D printer of claim 8 wherein the pressure source is a negative pressure source.

12. The 3D printer of claim 11 wherein the pressure source is a vacuum operatively connected to the porous substrate to pull inert gas released from the source of inert gas through the plurality of passageways in the porous substrate.

13. The 3D printer of claim 2, the controller being further configured:

operate the radiation source for a period of time sufficient to cure the liquid photo curable resin at the position between the support platform and the second surface of the porous substrate without producing an average intensity of the radiation within any of the passageways in the plurality of passageways in the porous substrate that is sufficient to cure the liquid photo curable resin within any of the passageways in the plurality of passageways in the porous substate.

14. The 3D printer of claim 1, the porous substrate further comprising:

a plurality of glass tubes, each glass tube in the plurality of glass tubes having a first end and a second end, the glass tubes in the plurality of glass tubes are arranged parallel to one another so the first ends of the glass tubes in the plurality of glass tubes are located at the first surface of the porous substrate and the second ends of the glass tubes in the plurality of glass tubes are located at the second surface of the porous substrate.

15. The 3D printer of claim 14 wherein each glass tube in the plurality of glass tubes has a diameter in a range of 10 to 15 μm.

16. The 3D printer of claim 14 wherein each glass tube in the plurality of glass tubes has a length of 400 to 1000 microns.

17. The 3D printer of claim 16 wherein each glass tube in the plurality of glass tubes has a diameter in a range of 10 to 15 μm.

18. The 3D printer of claim 1 wherein the porous substrate is one of a metal organic framework, a zeolite, a porous silicon substrate, and a macro-porous polymer substrate.

19. The 3D printer of claim 1 wherein an index of reflection for the photo curable resin passing through the porous substrate and an index of reflection for the porous substrate differ from each other by 10 percent.

* * * * *